UNITED STATES PATENT OFFICE.

HENRY STAFFORD HATFIELD AND FRANK MICHAEL LEWIS, OF BRIGHTON, ENGLAND.

ARC-LAMP ELECTRODE.

No. 904,532.

Specification of Letters Patent.

Patented Nov. 24, 1908.

Application filed July 31, 1908. Serial No. 446,340.

*To all whom it may concern:*

Be it known that we, HENRY STAFFORD HATFIELD, residing at 18 Palmeira Square, Hove, Brighton, in the county of Sussex, England, electrochemist, and FRANK MICHAEL LEWIS, residing at 11 Buckingham road, Brighton, in the county of Sussex, England, electrical engineer, have invented new and useful Improvements in Arc-Lamp Electrodes, of which the following is a specification.

Our invention is not concerned with such flame arc lamps as use a non-carbon electrode, such as oxid of iron with oxid of titanium added. On the other hand our invention is an improvement on flame arc lamps in which the electrode is composed of carbon and a metallic fluorid, preferably calcium fluorid. It has not heretofore been found possible to burn such carbons in an inclosed or air-tight globe for the reason that the large amount of salt vapor emitted from the arc condenses on the inclosing globe and prevents the proper emission of light and for the further reason that the arc is so unsteady as to fail to meet present-day requirements. But the importance of burning carbons inclosed, that is to say of using an arc lamp of the inclosed variety, is well recognized since it greatly diminishes the consumption of the electrodes.

We have been enabled to produce an arc lamp of the inclosed variety using a carbon to which a metallic fluorid has been added as a flaming material, and this without interfering with the steadiness of the light, by adding to the carbon and the metallic fluorid silicon in an incompletely oxidized form. Thus for example we have found that adding, to the well known arc lamp electrode, which consists of twenty-five per cent. of calcium fluorid and seventy-five per cent. of pure carbon, silicon in the form of carborundum and to the extent of five to ten per cent. greatly improves the mechanical strength of the electrode and also the steadiness of the light given by it, when the arc is burned without access of air.

We use the term "incompletely oxidized" silicon to denote the forms of silicon in which its full valency for or power of taking up oxygen has not been substantially satisfied as is the case with silica $(SiO_2)$ or the silicates. Thus under the term incompletely oxidized silicon we include uncombined silicon as well as compounds of silicon in which it occurs in combination with metals as silicides or in combination with carbon as in carborundum. So, too, we include compounds in which the silicon is combined with oxygen but not to the full extent required to form silica $(SiO_2)$. Such a compound is that known as siloxicon SiOC. These bodies produce the desired good result and we believe that this is due to the fact that they supply silicon vapor to the arc. Silica and silicates on the other hand do not produce the required results and we believe that this is due to the fact that these compounds of silicon and oxygen are not decomposed at the temperature of the arc. We therefore make no claim to the use of silica or silicates. We have obtained good results by employing calcium fluorid and carborundum in the proportions of about eight parts of the former to four or five of the latter and we mix therewith carbon in any desired proportions. We find that the combination of calcium fluorid and carborundum requires such a high temperature to fuse properly that it is apt to accumulate on the electrodes. To obviate this we find it advantageous to add a flux such for example as the fluorids of barium, magnesium and strontium, cryolite, burnt clay and the like.

We claim,—

1. An inclosed arc lamp having its inclosed and light-giving electrode containing carbon, a metallic fluorid, and silicon in an incompletely oxidized condition to improve the steadiness of the light, substantially as described.

2. An inclosed arc lamp having its inclosed and light-giving electrode containing carbon, a metallic fluorid and carborundum to improve the steadiness of the light, substantially as described.

3. An inclosed arc lamp having its inclosed and light-giving electrode composed of some eight parts of calcium fluorid, five parts of carborundum, and carbon, substantially as described.

4. An inclosed arc lamp having its inclosed and light-giving electrode containing carbon, calcium fluorid and carborundum to improve the steadiness of the light, substantially as described.

In witness whereof we have signed our names to this specification in the presence of two subscribing witnesses.

HENRY STAFFORD HATFIELD.
FRANK MICHAEL LEWIS.

Witnesses:
F. L. RAND,
R. J. WILLIAMS.